United States Patent [19]

Hashimoto et al.

[11] Patent Number: 4,777,608
[45] Date of Patent: Oct. 11, 1988

[54] APPARATUS FOR STARTING PLAYBACK ACTION OF TEACHING-PLAYBACK ROBOT

[75] Inventors: Hideki Hashimoto; Satoru Nakamura, both of Kobe, Japan

[73] Assignee: Kabushiki Kaisha Kobe Seiko Sho, Kobe, Japan

[21] Appl. No.: 32,361

[22] Filed: Mar. 31, 1987

[30] Foreign Application Priority Data

Apr. 8, 1986 [JP] Japan ............................ 61-52451[U]

[51] Int. Cl.$^4$ ..................... G06F 15/46; G05B 19/42
[52] U.S. Cl. .................................. 364/513; 318/568; 364/193; 364/478; 901/3; 901/7
[58] Field of Search ............... 364/478, 468, 513, 474, 364/475, 191–193; 901/6, 7, 3–5; 318/568

[56] References Cited

U.S. PATENT DOCUMENTS

| | | | |
|---|---|---|---|
| 4,092,719 | 5/1978 | Salmon | 364/468 |
| 4,468,741 | 8/1984 | Simonton | 364/478 X |
| 4,543,639 | 9/1985 | Inaba et al. | 364/513 |
| 4,549,276 | 10/1985 | Inaba et al. | 364/513 |

*Primary Examiner*—Joseph Ruggiero
*Attorney, Agent, or Firm*—Oblon, Fisher, Spivak, McClelland & Maier

[57] ABSTRACT

An apparatus for starting a playback action of a teaching-playback robot, which is simple in construction and capable of handling works of various kinds or types, essentially including in combination: a start signal generating mechanism adapted to produce an output start signal upon detecting arrival of a work being transferred by a conveyer at a predetermined position upstream of a teaching-playback robot; a discriminating mechanism for detecting the type of the workpiece which has arrived; a delay amount selector mechanism for selecting a delay amount according to the type of the detected workpiece; and a start delay mechanism for delaying the start of the playback action of the teaching-playback robot by the selected delay amount from the point in time of production of the start signal. In a preferred form of the invention, the start delay mechanism includes a plurality of counters for simultaneously controlling the delay amounts of a plurality of workpieces which are successively transferred by a conveyer.

5 Claims, 10 Drawing Sheets

APPARATUS FOR STARTING PLAYBACK ACTION OF TEACHING-PLAYBACK ROBOT

BACKGROUND OF THE INVENTION

1. Field of the Invention

This invention relates to an apparatus for starting a teaching-playback robot, and more particularly to an apparatus for starting a playback action of the robot when a workpiece on a conveyer is transferred to an optimum position for the robot operation.

2. Description of the Prior Art

Figure 6:
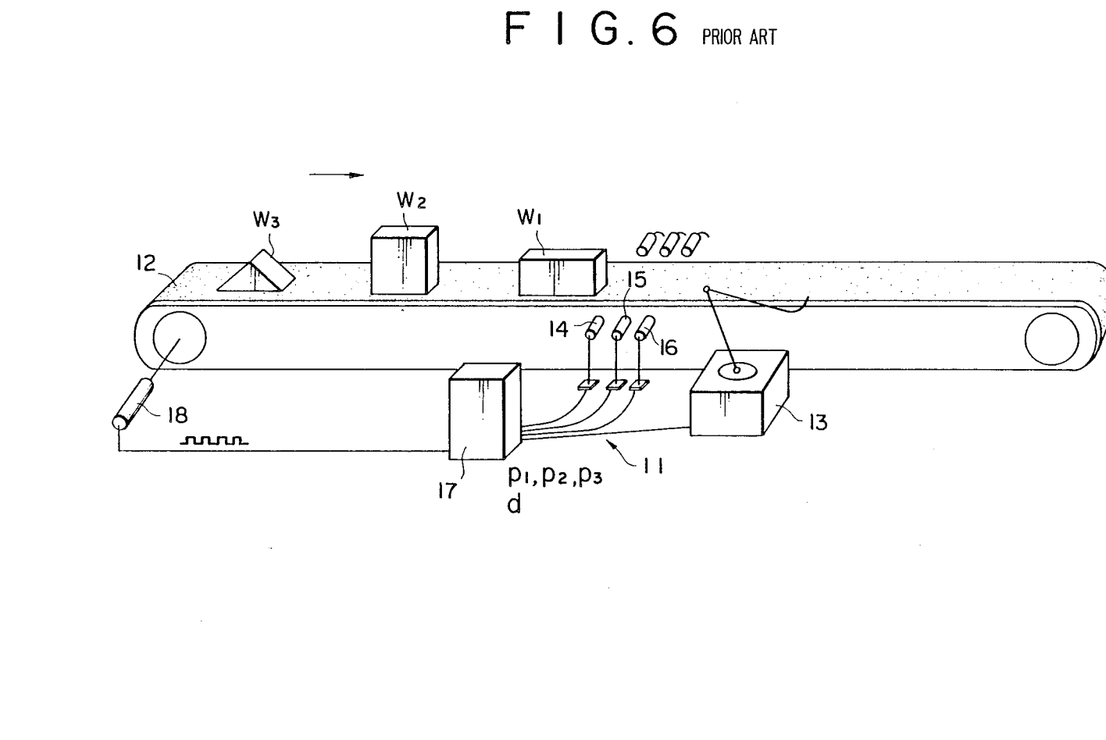
FIG. 6 is a view similar to FIG. 1 but showing a conventional apparatus.

Illustrated in FIG. 6 is an example of a conventional starting apparatus for teaching-playback robots. The conventional apparatus which is generally indicated at 11 employs a plurality of start signal generating means 14, 15 and 16 at positions located beside a conveyor 12 carrying workpieces W1, W2 and W3 and upstream of a teaching-playback robot 13, counting the number of conveyer pulses which are generated by a conveyer pulse generator 18 in synchronism with the movement of the conveyer 12 upon detection of a workpiece by one of the start signal generating means to start playback action of a working program by the teaching-playback robot 13 as soon as the number of the conveyer pulses reaches a predetermined number.

A plurality of start signal generating means 14 to 16 are provided to cope with the different kinds of workpieces W1 to W3. The start of playback action is delayed by counting a predetermined number of the conveyer pulses until the workpiece is transferred a distance D and advanced to a position in front of the teaching-playback robot.

Figure 7A:
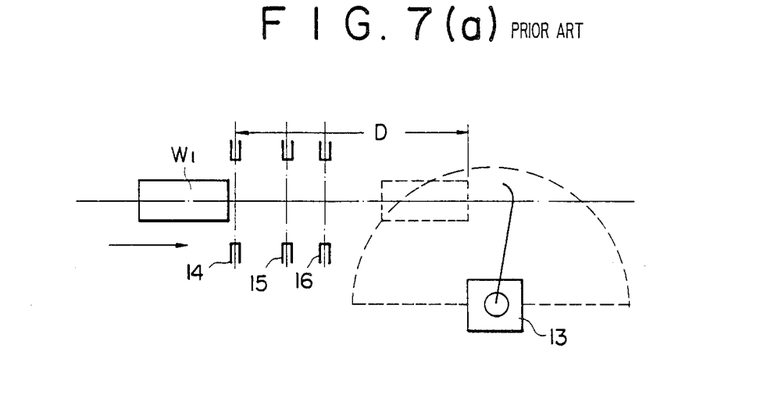
FIGS. 7(a) to 7(c) are views similar to FIGS. 2(a) to 2(c) but showing the delay amounts of workpieces of the conventional apparatus.
Figure 7B:
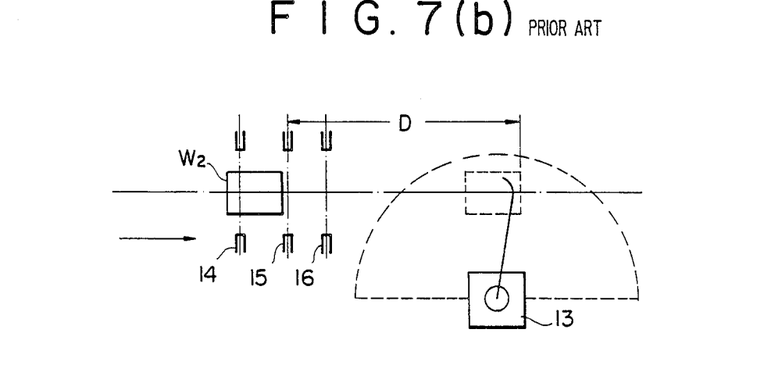
Figure 7C:
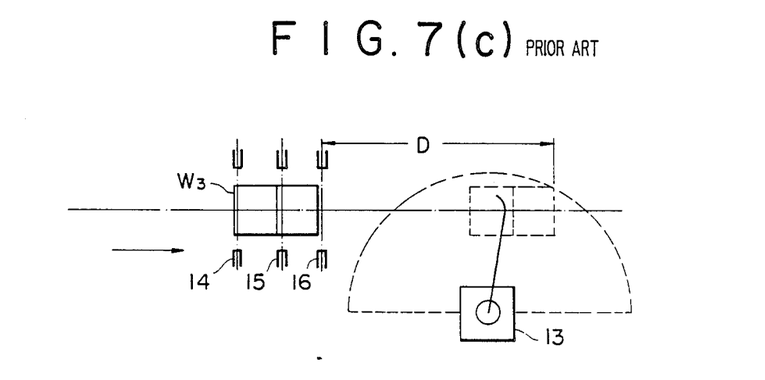

Namely, as shown particularly in FIG. 7(a), the start signal generating means 14 is selected for the workpiece W1, and the playback action of the teaching-playback robot 13 is started at a point in time when the workpiece W1 has been transferred a distance D after detection by the start signal generating means 14. The operation is started when a working part of the workpiece W1, for example, the front side portion of the workpiece W1 reaches a position in front of the robot 13 to let the teaching-playback robot 13 operate in an optimum working range. For the workpiece W2, the start signal generating means 15 is selected as shown in FIG. 7(b). Accordingly, the playback action of the working program is started when a working portion of the workpiece W2, for example, the upper side portion of the workpiece W2 reaches to a position in front of the teaching-playback robot 13. Further, as shown in FIG. 7(c), the start signal generating means 16 is selected for the workpiece W3. In this case, the playback action by the robot 13 is started when a working portion of the workpiece W3, for example, the rear side portion of the workpiece W3 reaches to a position in front of the robot 13.

Accordingly, it has been necessary to provide a plurality of start signal generating means respectively for a plurality of workpieces W1 to W3 of different types to let the teaching-playback robot 13 operate constantly in an optimum working range.

However, the above-described conventional apparatus which needs to provide a large number of start signal generating means depending upon the kinds of workpieces is complicated in structure and very costly, coupled with a problem in that the actual number of start signal generating means has a limit and cannot be increased more to cope with a great diversity of workpieces.

SUMMARY OF THE INVENTION

It is an object of the present invention to provide an apparatus for starting a playback action of a teaching-playback robot, which can start playback action of a working program at point in time when a workpiece arrives in an optimum working range of the robot irrespective of the kind of the workpiece, and which is simple in construction and it can easily cope with workpieces of various types.

In accordance with the present invention, there is provided an apparatus for starting playback action of a teaching playback robot, which essentially includes: start signal generating means adapted to produce an output start signal as soon as a workpiece on a conveyer is delivered to a predetermined position upstream of a teaching-playback robot; discriminating means for detecting the kind of delivered workpiece; a delay selector means for selecting a delay amount for the delivered workpiece; and start delay means for delaying the start of the playback action of said robot by the selected delay amount from the time point of production of said output start signal.

In the above-described conventional apparatus, a constant delay amount is given for starting the playback action of the teaching-playback robot after detection of a workpiece by one start signal generating means, so that it has been necessary to locate a plurality of start signal generating means in different positions along the conveyer.

With the apparatus according to the invention, however, the delay amount which determines the time interval between the detection of a workpiece by a start signal generating means and the start of playback action of a working program by the teaching-playback robot is automatically selected according to the type of detected workpiece.

Accordingly, even though the apparatus of the invention employs only one start signal generating means, the playback action of a working program can be started when a working portion of each workpiece arrives in a suitable working range of the teaching-playback robot.

The use of a single start signal generating means contributes to simplifying the construction of the apparatus. In addition, since there is no limit to the value of the delay amount, the apparatus can easily cope with various kinds of workpieces.

The above and other objects, features and advantages of the invention will become apparent from the following description and the appended claims, taken in conjunction with the accompanying drawings which show by way of example preferred embodiments of the invention.

DESCRIPTION OF THE PREFERRED EMBODIMENTS

Figure 1:
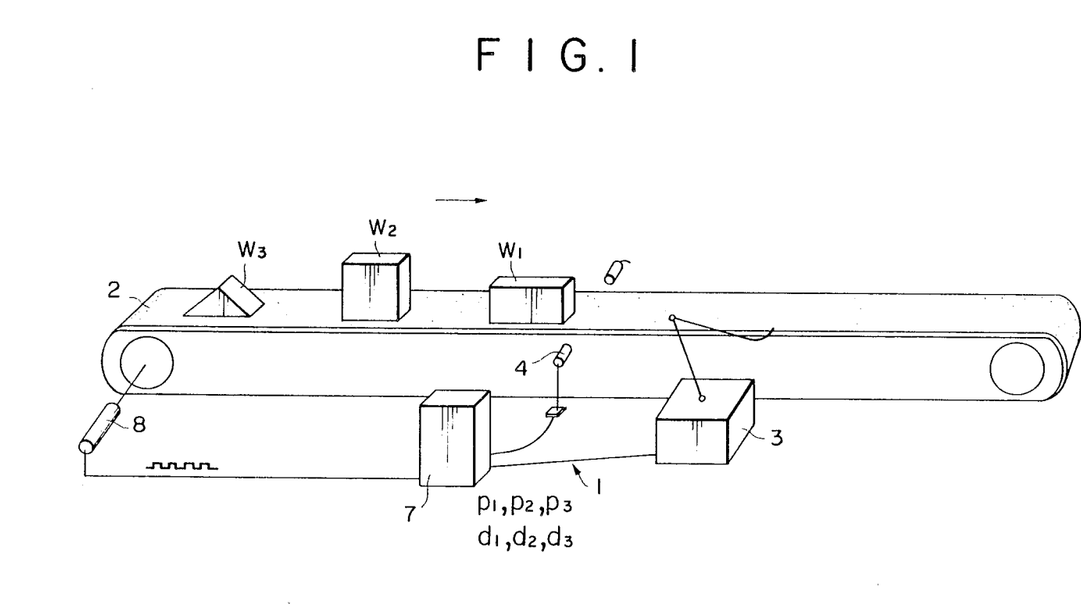
FIG. 1 is an external view of a working line system for a teaching-playback robot, incorporating a playback action starting apparatus according to the present invention.

Hereafter, the invention is described more particularly by way of the preferred embodiments shown in the drawings. Referring first to FIG. 1, there is shown a working line system for a teaching-playback robot, incorporating a playback action starting apparatus according to the invention. As shown in this figure, workpieces W1 to W3 are transferred by a conveyer 2 in the arrowed direction. A teaching-playback robot 3 is located in a position adjacent to the conveyer 2, and a start signal generating means 4 is located in a predetermined position upstream of the robot 3.

Indicated at 7 is a robot control panel which is centrally provided with a computer including memories for storing the working programs P1, P2 and P3 for the workpieces W1, W2 and W3 and the delay amounts d1, d2 and d3 corresponding to the working programs P1, P2 and P3.

Figure 2A:
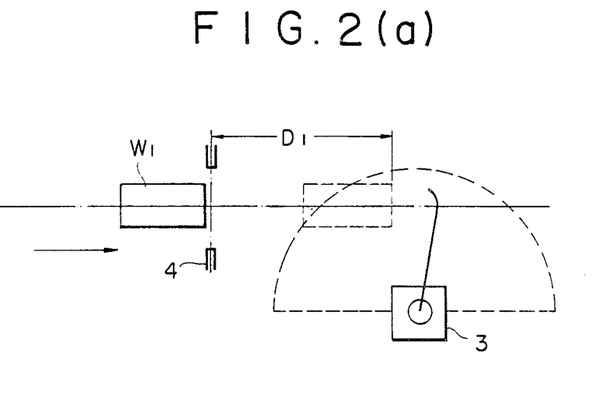
FIGS. 2(a) to 2(c) are diagrammatic plan views showing the delay amounts for different workpieces.
Figure 3A:
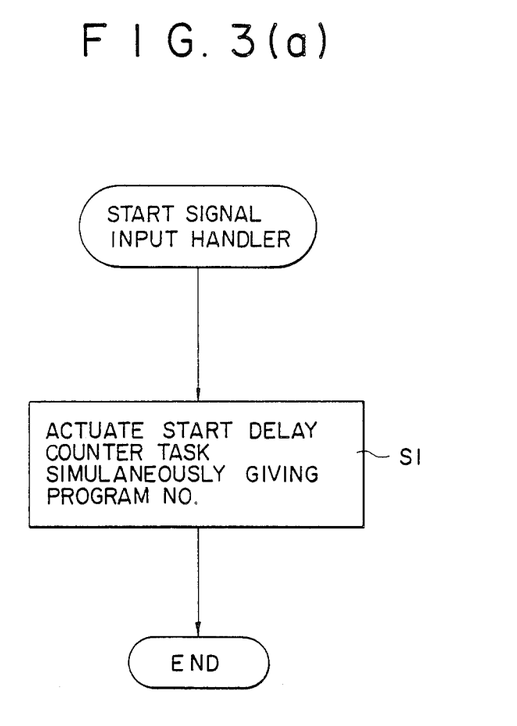
FIGS. 3(a) and 3(b) are flowcharts illustrating major steps in the operation in one embodiment of the invention.
Figure 3B:
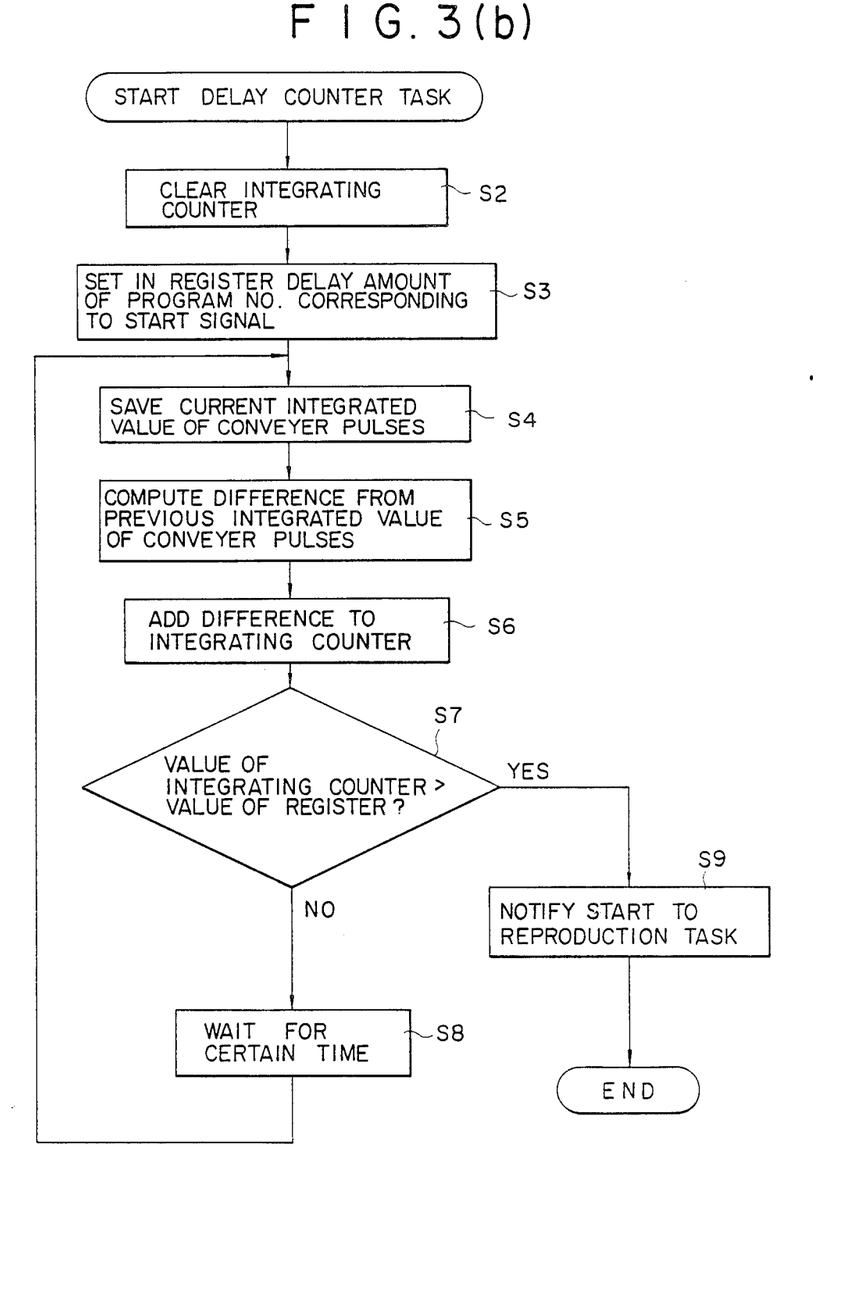

Reference is now had to FIGS. 2(a), 3(a) and 3(b) for explanation of operation. As soon as the workpiece W1 reaches a position in front of the start signal generating means 4, the latter produces and supplies a start signal to the robot control panel 7.

Upon receipt of the start signal, the robot control panel 7 actuates the start delay counter task as indicated in FIG. 3(a), simultaneously giving thereto the program number, namely, the working program number P1 for the workpiece W1.

This program number P1 is available by reading an identification mark labeled on the workpiece W1 with use of a mark reader or the like or by reading it out upon production of the start signal from a memory which stores the program numbers in a tabulated form according to the predetermined order of workpieces.

As shown in FIG. 3(b), the start delay counter task clears an integrating counter which is provided in the robot control panel 7. (Step 2)

Nextly, the delay amount corresponding to the program number given in Step 1 is read out, and set in the register. (Step 3) More specifically, the delay amount d1 which corresponds to the workpiece W1 is set in the register.

On the other hand, the robot control panel 7 reads out the integrated value from a counter means which is provided in the control panel to integrate conveyer pulses from a conveyer pulse generator 8. (Step 4)

In the next place, a difference from an integrated value, which had been previously read out and stored in memory, is computed (Step 5), and added to an integrating counter. (Step 6) Initially, the difference is set at 0 since no previously integrated value exists. That is to say, the number of the conveyer pulses after detection of the workpeice is counted by the operations in Steps 4 to 6.

The counting is repeated until the count of the integrating counter reaches the delay amount which is set in the register. (Steps 7 and 8)

The count of the integrating counter reaches a value of the delay amount in the register as soon as the workpiece W1 is transferred by the conveyer 2 through a distance D1 corresponding to the delay amount d1 (Step 7), whereupon the robot control panel 7 instructs the playback task to start the action of the teaching-playback robot 3 for playback action of the workping program P1 for the read-out workpiece W1. (Step 9)

In this manner, the operation is started when a working portion of the workpiece W1 reaches a position in front of the teaching-playback robot 3, permitting the required operation to be performed in an optimum working range of the robot 3.

Figure 2B:
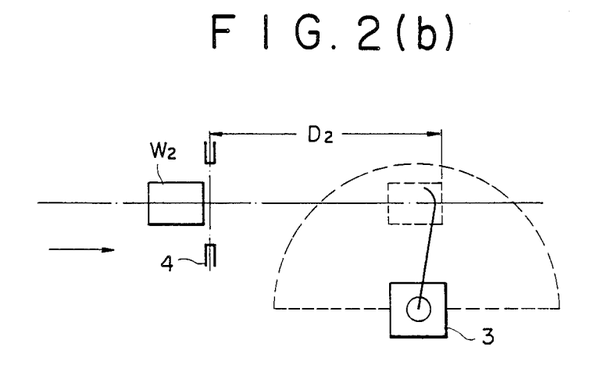

As shown in FIG. 2(b), the workpiece W2 is handled in a similar manner, reading out the delay amount d2 from the number of the workping program P2 for the work W2 and starting the playback action of the working program when the workpiece W2 has been advanced by a distance D2 which corresponds to the delay amount d2. Thus, the teaching-playback robot 3 is permitted to perform its operation in an optimum working range.

Figure 2C:
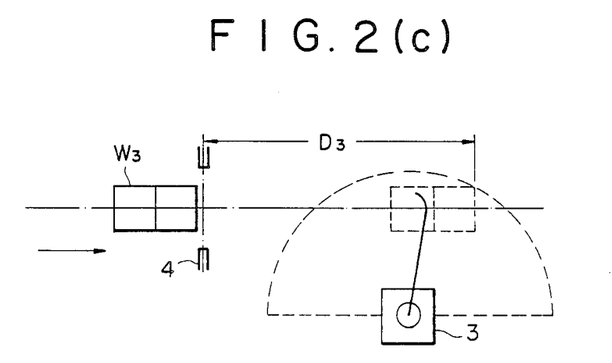

As shown in FIG. 2(c), start of the playback action for the workpiece W3 is delayed in the same manner, reading out the delay amount d3 from the number of the working program P3 for the workpiece W3 and starting the playback action at a time point when the workpiece W3 has been advanced by a distance D3 which corresponds to the delay amount d3. In this case, the teaching-playback robot 3 is also permitted to perform its operation in its optimum working range.

Figure 4A:
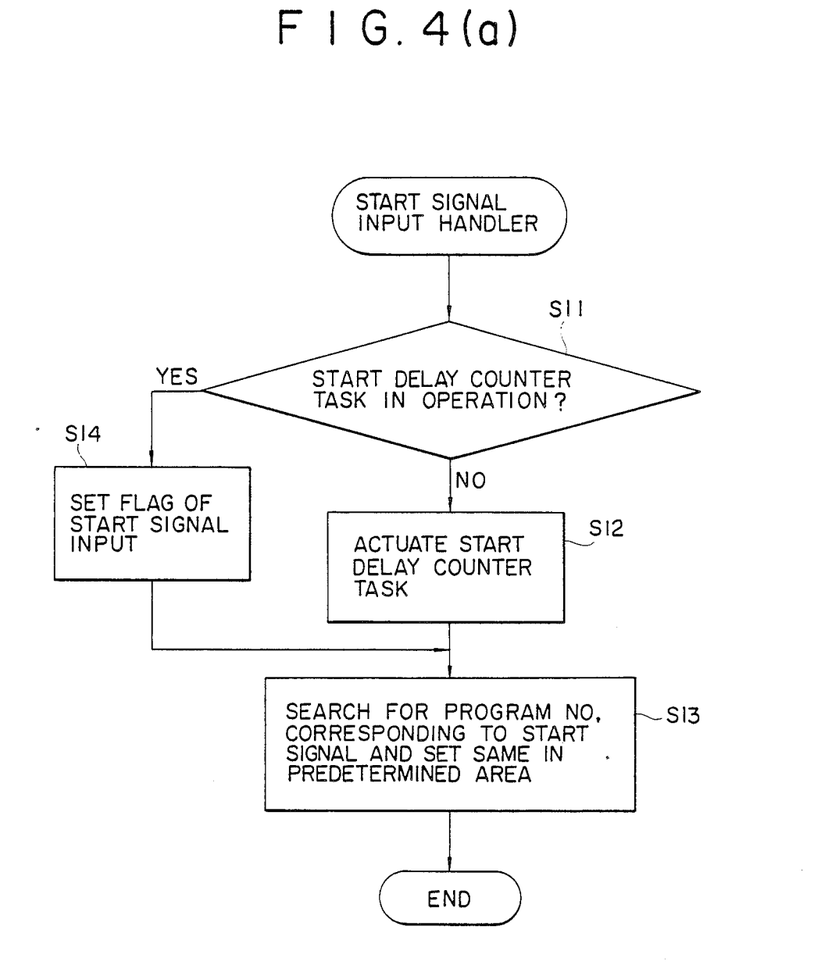
FIGS. 4(a) and 4(b) are flowcharts illustrating major steps in the operation in another embodiment of the invention.
Figure 4B:
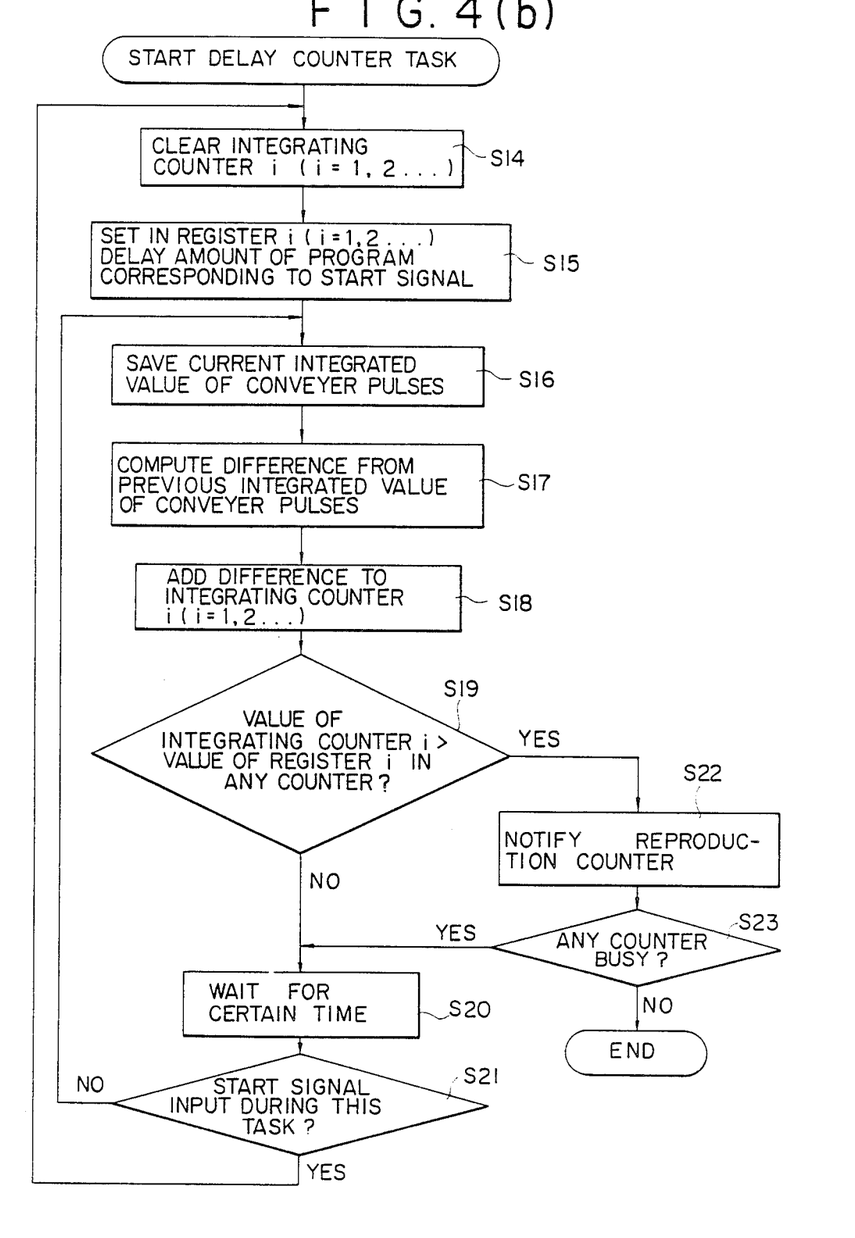

FIGS. 4(a) and 4(b) show another example of operation which is arranged to cope with a situation where a workpiece arrives at a predetermined position while a preceding workpiece is still being processed.

Namely, as a start signal generating device 4 produces an output start signal upon detection of a workpiece as shown particularly in FIG. 4(a), a check is made to ascertain whether or not a start delay counter task is currently busy with an operation for other workpieces. (Step 11)

If not busy, the start delay counter task is actuated (Step 12), and the number of the working program corresponding to the start signal is searched out and set in a predetermined area. (Step 13)

On the other hand, if the start delay counter task is busy, a flag of the start signal input is set to maintain a memory of the new start signal. (Step 14) Then, the number of the working program corresponding to the new start signal is searched out and set in a predetermined area. (Step 13)

As shown in FIG. 4(b), the start delay counter task clears the integrating counter i alloted to the program number Pi which is set in the predetermined area (Step 14), reading out the corresponding delay amount di and setting same in the corresponding register i. (Step 15) In this instance, if the program numbers are set in a plurality of predetermined areas, the delay amounts are set in a plurality of corresponding registers.

Next, in Steps 16 to 18, the conveyer pulses are integrated by the integrating counter i. Where the delay amounts are set in a plurality of registers, the conveyer pulses are integrated by a plurality of corresponding integrating counters.

While none of the counts of the integrating counters exceeds the delay amount in the register i (Step 19), the task waits for a certain time period (Step 20), and checks whether or not a flag of the start signal input is set. (Step 21)

If a flag of start signal input is not set, the task goes to the processing of Step 16 and onwards, repeating integration of the conveyer pulses.

If a flat of the start signal input is set (Step 21), the task returns to Step 14, and clears an integrating counter corresponding to a program number which has been freshly set in a predetermined area (Step 14), reading out its delay amount and setting the same in a corresponding register.

If any one of the counts of the integrating counters i which are in operation in Step 19 becomes greater than the delay amount of the corresponding register i, it means that the workpiece Wi corresponding to that counter i has reached the optimum working range of the teaching-playback robot 3, so that a starting cue is given to the playback task. (Step 22)

The start delay counter task returns the processing to integration of conveyer pulses if any other counter is still in operation (Step 23), and ends if not.

As described hereinabove, the operation of FIGS. 4(a) and 4(b) permits handling of a workpiece simultaneously with processing of another workpiece, thus contributing to shortening of the intervals between operations for the individual workpieces and improving working efficiency to a considerable degree.

Figure 5A:
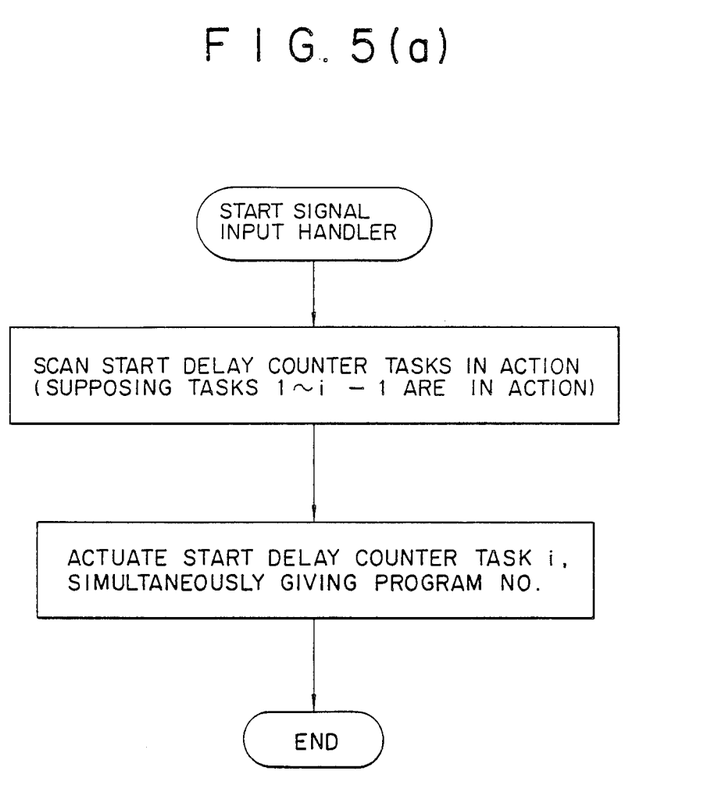
FIGS. 5(a) and 5(b) are flowcharts of major steps illustrating the operation in still another embodiment of the invention.
Figure 5B:
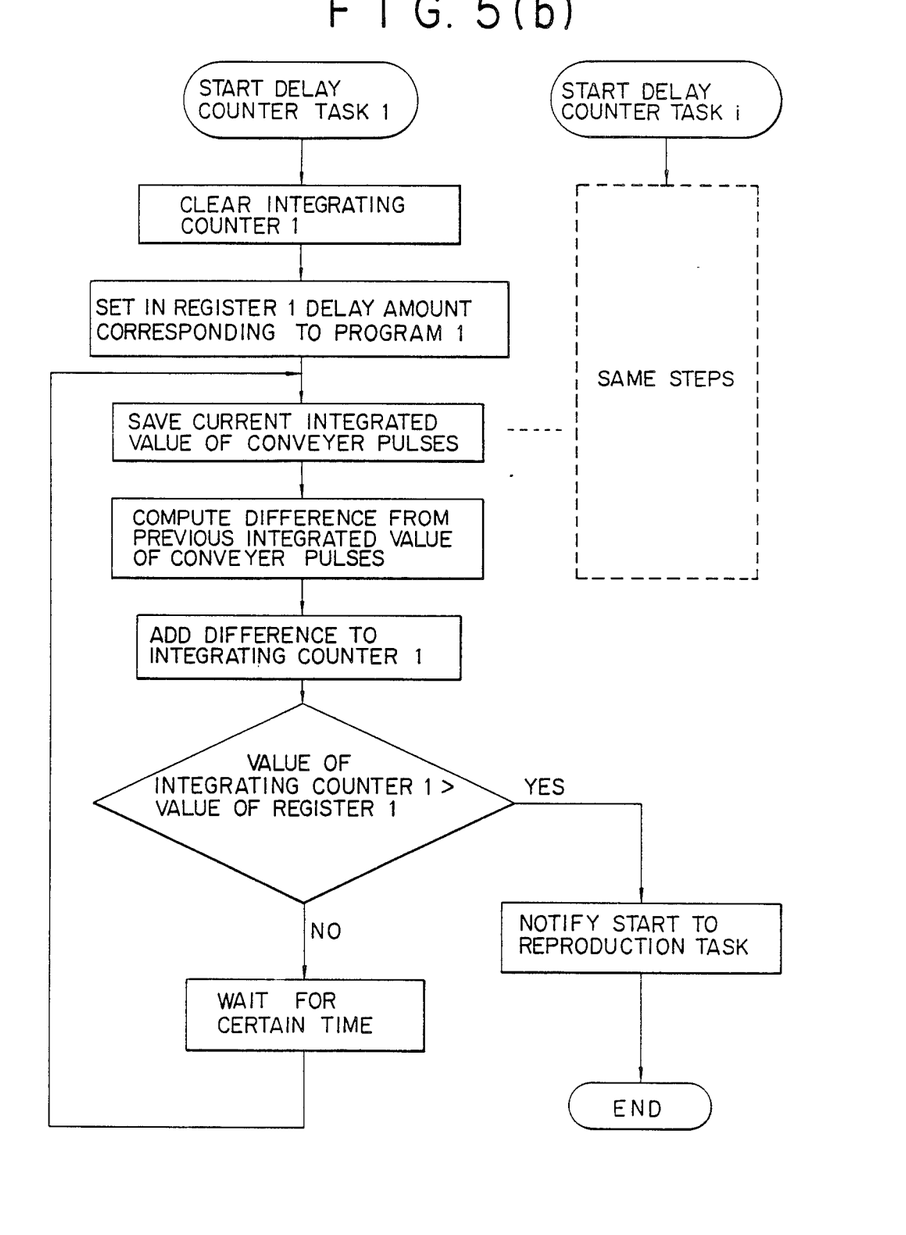

Shown in FIGS. 5(a) and 5(b) is an embodiment employing a plurality of start delay counter tasks correspondingly to the number of different workpieces. This embodiment is basically the same as in FIGS. 3(a) and 3(b), and therefore a detailed description in this regard is omitted to avoid unnecessary repetitions. Owing to the provision of a plurality of start delay counter tasks, it becomes possible to handle different workpieces simultaneously and as a result to enhance the working efficiency similarly to the embodiment shown in FIGS. 4(a) and 4(b).

Alternatively, instead of determining the delay amount or the work transfer distance by integration of the conveyer pulses, there may be employed a system of controlling the delay amount or work transfer time by counting clock pulses of a predetermined frequency. Such a time control system is useful in a case there is no necessity for synchronizing the teaching-playback robot 3 with the conveyer 2 or where the conveyer pulse generator 8 is not provided.

It will be appreciated from the foregoing description that the playback starting apparatus for teaching-replay robot according to the present invention is provided with start signal generating means adapted to produce a start signal when a workpiece on a conveyer arrives at a predetermined position upstream of a teaching-playback robot, discriminating means for identifying the type of workpiece, delay selector means for selecting a delay amount according to the type of identified workpiece, and start delay means for delaying the start of the playback action of the teaching-playback robot by the selected delay amount from the point in time of production of the start signal. The apparatus can be simplified in construction since there is no necessity for providing a plurality of start signal generating means, and can cope with workpiece of different types suitably, starting playback action of a working program for each workpiece in an optimum range of the teaching-playback robot.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for starting a playback action of a teaching-playback robot, comprising:
    a conveyor belt;
    starting signal generating means adapted to produce an output start signal upon detecting arrival of a workpiece transferred by said conveyor at a predetermined position upstream of a teaching-playback robot;
    discriminating means for detecting the type of said workpiece;
    delay amount selector means for selecting a delay amount according to the type of the detected workpiece; and
    start delay means for delaying the start of the playback action of said teaching-playback robot by the selected delay amount from a point in time of production of said output start signal.

2. The apparatus of claim 1, wherein said delay amount is expressed in terms of the number of conveyer pulses generated in synchronism with movement of said conveyer.

3. The apparatus of claim 1, wherein said delay amount is expressed in terms of the number of clock pulses generated at a predetermined frequency.

4. The apparatus of claim 1, wherein said start delay means includes a plurality of integrating counters and adapted to actuate a non-busy counter in response to an input start signal thereby to measure said delay amount.

5. The apparatus of claim 4, wherein said start delay means is adapted to clear a counter corresponding to the number of a working program of a detected workpiece in response to an input start signal irrespective of whether or not another counter is in operation for a preceding workpiece, and to generate a start signal as soon as the count of any of integrating counters in operation reaches a delay amount for the program number thereof.

* * * * *